US005621524A

United States Patent [19]

Mitani

[11] Patent Number: 5,621,524

[45] Date of Patent: Apr. 15, 1997

[54] METHOD FOR TESTING INK-JET RECORDING HEADS

[75] Inventor: Masao Mitani, Hitachinaka, Japan

[73] Assignee: Hitachi Koki Co., Ltd., Tokyo, Japan

[21] Appl. No.: 630,598

[22] Filed: Apr. 10, 1996

Related U.S. Application Data

[63] Continuation-in-part of Ser. No. 502,179, Jul. 13, 1995.

[30] Foreign Application Priority Data

| | | | |
|---|---|---|---|
| Jul. 14, 1994 | [JP] | Japan | 6-162151 |
| Aug. 26, 1994 | [JP] | Japan | 6-201985 |
| Dec. 9, 1994 | [JP] | Japan | 6-306076 |
| Apr. 11, 1995 | [JP] | Japan | 7-085212 |
| Jun. 1, 1995 | [JP] | Japan | 7-135185 |

[51] Int. Cl.[6] .......... G01N 21/00

[52] U.S. Cl. .......... 356/338; 250/574

[58] Field of Search .......... 356/335–343; 250/573, 576

[56] References Cited

U.S. PATENT DOCUMENTS

| | | | |
|---|---|---|---|
| 5,357,117 | 10/1994 | Hayashi et al. | 356/338 |
| 5,411,682 | 5/1995 | Nagashima | 356/338 |

FOREIGN PATENT DOCUMENTS

| | | |
|---|---|---|
| 489622 | 2/1973 | Japan . |
| 5451837 | 4/1979 | Japan . |
| 59138472 | 8/1984 | Japan . |
| 671888 | 3/1994 | Japan . |
| 6238901 | 8/1994 | Japan . |
| 6297714 | 10/1994 | Japan . |

OTHER PUBLICATIONS

J. Baker et al.; "Design and Development of a Color Thermal Inkjet Print Cartridge"; Hewlett–Packard Journal, Aug. 1988, pp. 6–15.

Nikkei Mechanical, Dec. 28, 1992 edition, pp. 58–63.

*Primary Examiner*—Hoa Q. Pham

*Attorney, Agent, or Firm*—Whitham, Curtis, Whitham & McGinn

[57] ABSTRACT

In an ink jet recording device having a print head wherein an expanding bubble formed in ink ejects an ink droplet from an orifice, a method for testing wafers on which a large number of print heads are formed is provided wherein the head is filled with pure water, water droplets of the pure water is ejected by application of a start signal to the print head, ejected water droplets is irradiated with condensed light, and the condensed light scattered by the ejected water droplets is detected. The time at which the scattered light was detected is correlated with time of the start signal, and it is determined whether the head is good or not according to the correlation of the time at which the scattered light was detected and the time of the start signal.

6 Claims, 16 Drawing Sheets

A – A′ CROSS – SECTION

B – B′ CROSS – SECTION

C – C′ CROSS – SECTION

F – F' CROSS – SECTION

G – G' CROSS – SECTION

METHOD FOR TESTING INK-JET RECORDING HEADS

CROSS-REFERENCE TO RELATED APPLICATION

This application is a continuation-in-part application of the U.S. application Ser. No. 08/502,179 filed Jul. 13, 1995.

BACKGROUND OF THE INVENTION

1. Field of the Invention

The present invention relates to a test method for a print head of an ink jet printer.

2. Description of the Related Art

Japanese Laid-Open Patent Publication (hereinafter referred to as "OPI publication") Nos. SHO-48-9622 and SHO-54-51837 describe an ink jet recording device wherein a portion of ink in an ink chamber is rapidly vaporized to form an expanding bubble. The expansion of the bubble ejects an ink droplet from an orifice connected with the ink chamber. As described in the August 1988 edition of Hewlett Packard Journal and the Dec. 28, 1992 edition of Nikkei Mechanical (see page 58), the simplest method for rapidly heating the portion of the ink is by applying an energizing pulse of voltage to a heater. Heater described in the above-noted documents are constructed from a thin-film resistor and thin-film conductors covered with an anti-corrosion layer for protecting the resistor from corrosion damage. The anti-corrosion layer is additionally covered with one or two anti-cavitation layers for protecting the anti-corrosion layer against cavitation damage.

OPI publication No. HEI-6-71888 describes a protection-layerless heater formed from a Cr-Si-SiO or Ta-Si-SiO alloy thin-film resistor and nickel conductors. Absence of protection layers to the heater greatly improves efficiency of heat transmission from the heater to the ink. This allows great increases in print speed, i.e., in frequency at which ink droplets can be ejected. A print head wherein such heaters are used can be more simply produced.

Ink droplets can be ejected by applying only small amounts of energy to the heaters. The area surrounding the heaters will not be heated up by small amount of energy applied. Therefore, the LSI chip for driving the heaters can be formed near the heaters without fear of the LSI being damaged by overheating. OPI publication Nos. HEI-6-238901 and HEI-6-297714 describes an on-demand head with a simple monolithic structure wherein the LSI chip for driving the heaters is positioned near the heaters. The print head has many nozzles arranged two dimensionally at a high density. Also, the number of control wires is greatly reduced.

The present inventors realized that bubbles generated using the protection-layerless heaters have excellent generation and contraction characteristics. The present inventors also realized that these generation and contraction characteristics can greatly reduce cross-talk in a top-shooter or side-shooter thermal ink jet printer head driven using a new drive method. This indicates that the resistance to ink in the ink supply pathway can be reduced by shortening the length of individual ink channels for each nozzle. Since the ink supply pathway is shorter, the time to refill an ink chamber with ink after it is fired can be reduced so that printing speed can be increased.

The print head according to the present invention may appear to be analogous in structure to the print head described in OPI publication No. HEI-59-138472. However, where the OPI publication No. HEI-59-138472 describes a common channel for supplying ink to the ink ejection chambers as having a width in the range of 2 to 850 mm, the present invention has a common ink channel connected integrally to the individual ink channel formed in the same substrate, and the total width including the common ink channel and the individual ink channel is 0.2 mm.

SUMMARY OF THE INVENTION

It is an object of the present invention to provide a method for testing wafers when a large number of print heads are formed on the surface of a single wafer.

In accordance with the present invention, a print head testing method is performed by firstly filling the head with pure water, starting ejection of water droplets of the pure water by application of a start signal, irradiating ejected water droplets with condensed light, detecting condensed light scattered by the ejected water droplets, correlating time at which the scattered light was detected with time of the start signal, and finally determining whether the head is good or not according to the correlation of the time at which the scattered light was detected and the time of the start signal.

In the above-described testing method, proper functioning head chips will eject water droplets from proper functioning nozzles in response to the start signal. Additionally, water droplets ejected from properly functioning nozzles will all have virtually the same speed and shape. Therefore, the time at which all water droplets intersect the condensed light at a fixed position, which position may be about 10 mm from the surface of the nozzles, will have a fixed relationship to the time that the start signal was applied. Light scattered when the water droplets intersect the light bundle can be detected by a photosensor such as the photomultiplier. Therefore, good and defective head chips can be distinguished based on the time difference between the time of the ejection start signal and the time that light was scattered.

That is, this time difference will reach an infinite value for defective nozzles or head chips that eject no ink droplets. Some defective head chips and nozzles will eject water droplets, but at a slower speed or smaller size. Therefore, by determining defective head chips and nozzles based on both time difference and on amount of received light, testing can be performed automatically after setting standards for good and defective head chips and nozzles.

The test method of the present invention can also be applied to conventional head manufacturing methods wherein individual heads are formed separately.

BRIEF DESCRIPTION OF THE DRAWINGS

The above and other objects, features and advantages of the invention will become more apparent from reading the following description of the preferred embodiment taken in connection with the accompanying drawings in which:

FIG. 2(*b*) is a cross-sectional view taken along lines B—B' of FIG. 1;

FIG. 2(*c*) is a cross-sectional view taken along lines C—C' of FIG. 1;

FIG. 12(*b*) is a diagram showing details of the processes for making an orifice plate according to the present invention;

DETAILED DESCRIPTION OF THE PREFERRED EMBODIMENTS

Figure 1:
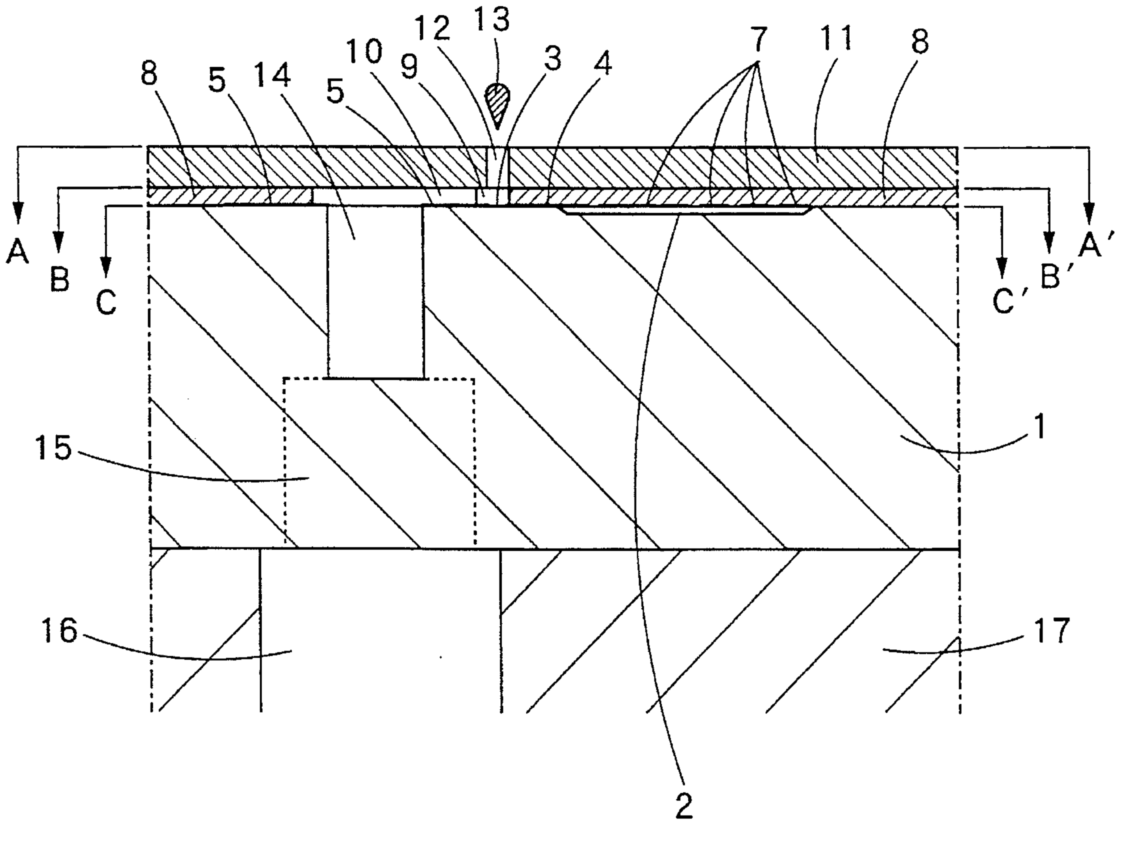
FIG. 1 is a cross-sectional view showing one nozzle 12 of a row of nozzles in an ink jet recording head according to a first embodiment of the present invention.

A printer and method of producing a print head for the printer according to a preferred embodiment of the present invention will be described while referring to the accompanying drawings wherein like parts and components are designated by the same reference numerals to avoid duplicating description.

Figure 2:
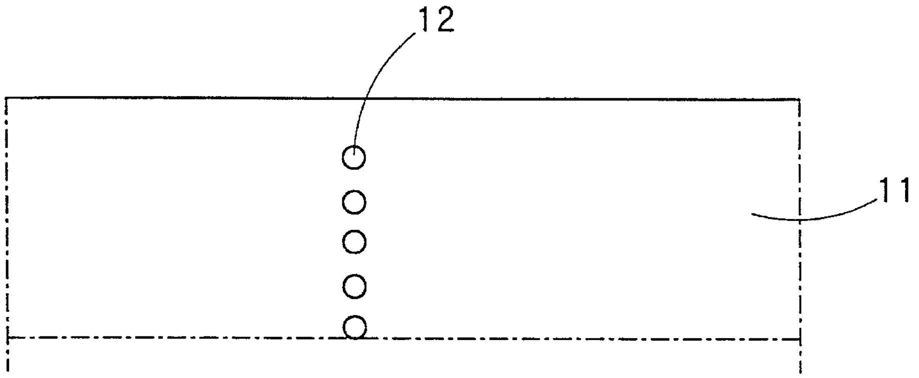
FIG. 2(*a*) is a cross-sectional view taken along lines A—A' of FIG. 1.
Figure 2:
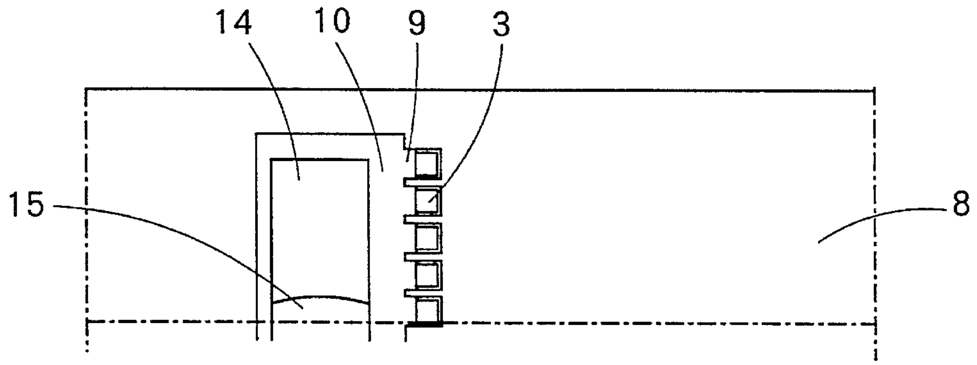
Figure 2:
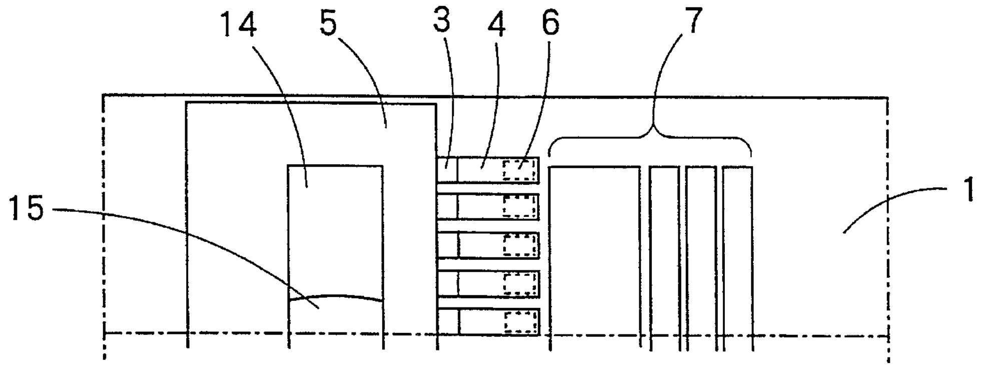

FIG. 1 is a cross-sectional view showing one nozzle 12 of a row of nozzles in an ink jet recording head according to a first embodiment of the present invention. The ink jet recording head has a nozzle density of 400 dpi. FIGS. 2(*a*), 2(*b*), and 2(*c*) are cross-sectional views taken along lines A—A', B—B', and C—C' respectively of FIG. 1. Processes for making this ink jet recording head will be described below while referring to FIGS. 1 through 9.

First Process

Using a slight modification of a standard bipolar LSI fabrication process for use on a (110) silicon wafer, a drive LSI device 2 is formed on a first surface of a (100) silicon wafer or of a (4° FF silicon wafer), which is a silicon wafer with a slant of 4 degrees compared to a (100) silicon wafer. It might be preferable to fabricate a BiCMOS or Power MOS type LSI device as the drive LSI device 2 depending on the cost of wafer production, chip size and yield, and other factors.

A $SiO_2$ film is formed to the surface of the silicon wafer during LSI fabrication processes. The $SiO_2$ film can be a thermal oxide film grown on the wafer, a film spun on as liquid glass using spin-on-glass (SOG) techniques, a phosphorus-doped $SiO_2$ (PSG) film, or an inter-layer $SiO_2$ films for use between multiple layers of aluminum wiring. Next, portions of the $SiO_2$ film where ink grooves 14 will be formed are removed using photoetching in order to prepare the surface for applying the photoresist used during anisotropic silicon etching of the ink grooves 14.

As shown in FIGS. 1 and 2, drive wiring conductors 7 for driving the thin-film heaters 3, which are formed in a second process to be described below, connect the LSI drive device 2 with an external source, not shown in the drawings, via connection terminals wired to one side of the substrate. Drive wiring conductors are provided for the power source, the ground, and for transmitting drive signals, such as data signals, clock signals, and latch signals. Individual wiring conductors 4 for each thin-film heater 3 are connected to the drive LSI device 2 via through-hole connection portions 6.

Second Process

An approximately 0.1 micron thick Cr-Si-SiO or Ta-Si-SiO alloy thin-film resistor and an approximately 1 micron thick nickel thin film are formed on the silicon wafer 1 using sputter techniques. Then the thin-film heaters 3 with resistance value of about 300 ohms, the individual wiring conductors 4, and a common thin-film conductor 5 are formed using photoetching techniques. These processes are described in detail in OPI publication No. HEI-6-71888, and so there explanation will be omitted here. The alloy thin-film resistor is formed using reactive sputter techniques in an argon atmosphere containing acid. The nickel thin film is formed using high-speed sputter techniques in a high magnetic field. The heaters and the silicon wafer are separated by an approximately 2 micron thick $SiO_2$ layer formed during fabricate of the LSI drive device 2. This $SiO_2$ layer forms a layer insulating the silicon wafer from the heat generated by the heaters.

Third Process

An approximately 20 micron thick layer of polyimide is accumulated on the first surface of the silicon wafer. Then a partition wall 8 is formed using photoetching techniques on an organosilicic resist. Dry etching, and more particularly reactive dry etching, allow etching with greater detail. The individual ink channels 9 and the common ink channel 10 were formed in clean shapes by etching the partition wall 8 using reactive dry etching with an oxygen plasma excited by an electron cyclotron resonance (ECR) source.

To form the partition wall 8 out of polyimide material, the surface of the silicon wafer 1 is coated with photosensitive polyimide, then the polyimide is exposed, developed, and hardened. Although presently available techniques can only produce a rather thin partition wall 8 of 10 microns, a thickness of more than 10 microns is desirable. However, to fabricate a high-density nozzle row of 800 dpi, 10 microns thick partition wall 8 suffices.

The partition walls 8 have never been formed from heat resistant resin. Conventionally, the partition wall in this position is formed from a photosensitive resist with low heat resistance. Because thermal pulses developed at the surface of the heaters can reach a temperature of 300° C. or greater, the heaters had to be formed at a position separated from the partition wall by about 10 microns to prevent damage to the partition wall. This structure limits nozzle density producible by conventional technology to about 400 dpi.

Figure 4:
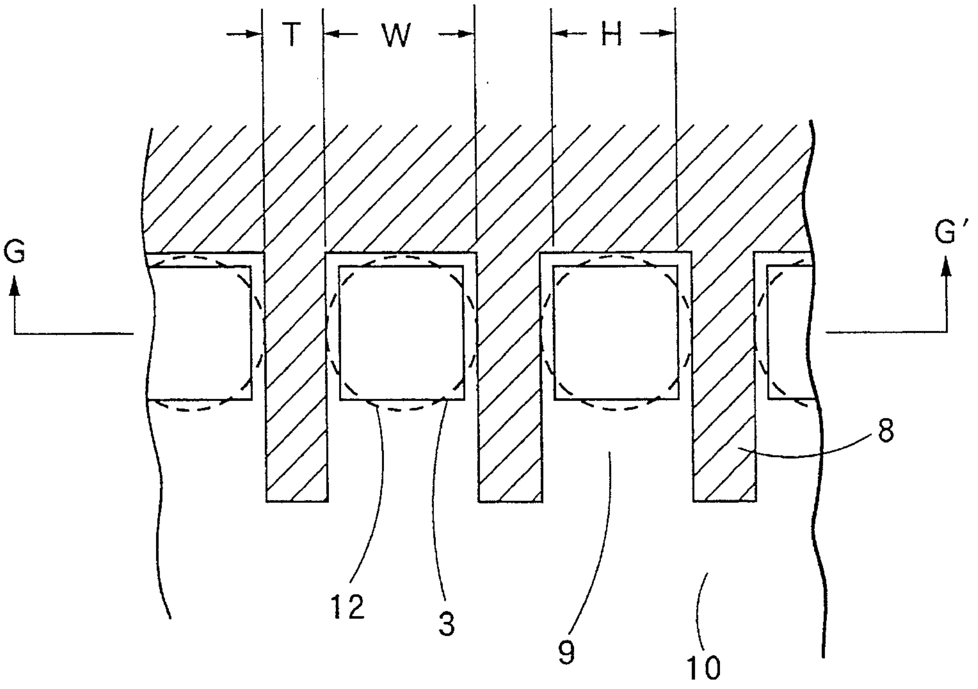
FIGS. 4(*a*) and 4(*b*) are cross-sectional views showing magnified details of an ink ejection head according to the present invention.
Figure 4:
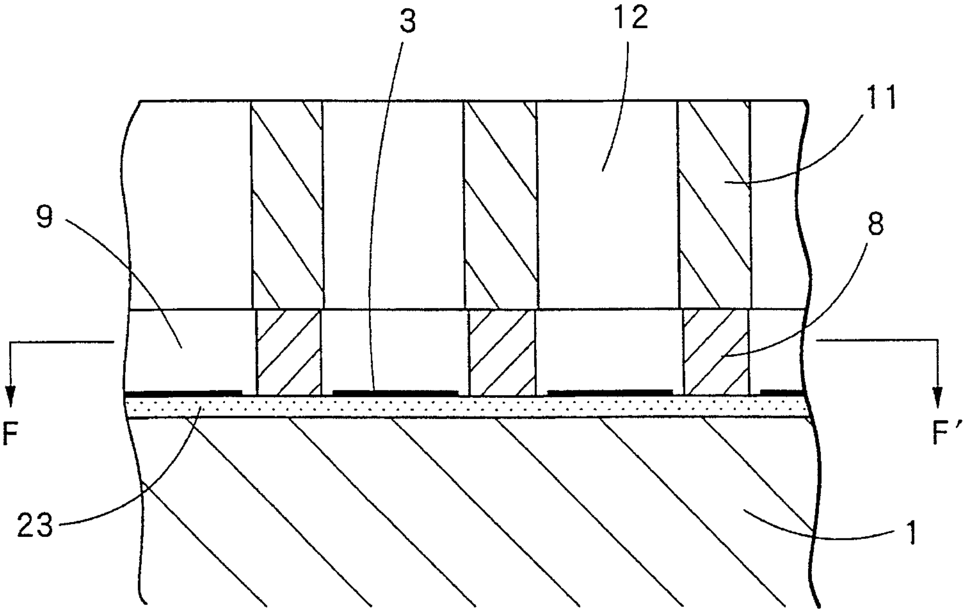

A highly reliable partition wall 8 can be made from a resin such as polyimide with high heat resistance and an initial thermal breakdown temperature of 400° C. Such a partition wall 8 will be reliable even if the temperature of the thin-film heaters 3 increases to 300° C. or more. A partition wall 8 sufficiently reliable to fabricate an 800 dpi head wherein dimensions T, W, and H shown in FIG. 4 are 9 microns, 22 microns, and 17 microns respectively, can be formed even taking deviations involved with photoetching into account.

Fourth Process

Figure 6:
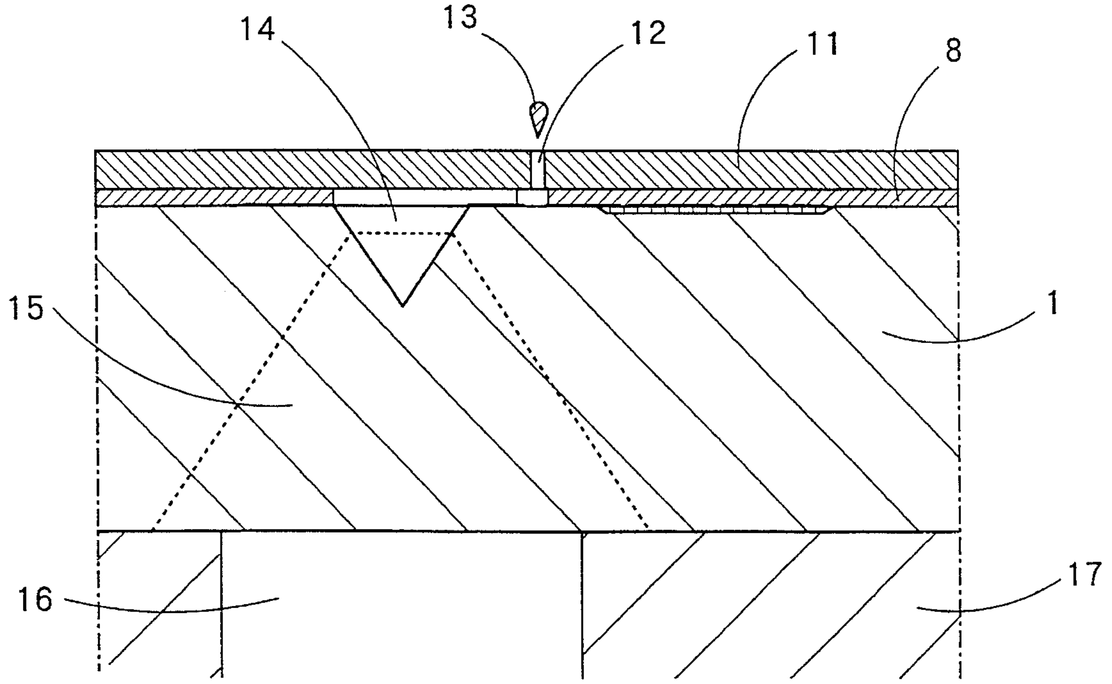
FIG. 6 is a cross-sectional view showing etching characteristic of a (100) silicon wafer, or (110) silicon wafer containing a 4 degree slant when forming another head according to the present invention.

Photoresist involved with formation of the through-holes 15 is formed on the rear surface of the silicon wafer 1. The ink grooves 14 and the through-hole 15 are formed simultaneously using silicon anisotropic etching from both sides of the wafer. Hydrazine aqueous solution, KOH aqueous solution, ethylene diamine aqueous solution, and the like can be used as the silicon anisotropic etching liquid. A (110) silicon wafer etches vertically as shown in FIG. 1. However, a (100) silicon wafer, or (110) silicon wafer containing a 4 degree slant, etches at a slant of about 55 degrees as shown in FIG. 6. Therefore, the openings for through-holes 15 need to be formed slightly wider at the surface of the silicon substrate than the minimum width desired for the through-holes 15. Anisotropic etch utilizes the fact that the etching speeds are extremely different between (110), (100) and (111) surfaces of a single crystal silicon. Therefore, some processing that is impossible using isotropic etching can be performed using anisotropic etching. The $SiO_2$ layer, that must be provided as an insulating layer between thin-film heaters 3 and the silicon wafer 1, is formed during processes to fabricate the drive LSI. The $SiO_2$ layer is used as a resist for anisotropic etching. Moreover, the ink grooves 14 and the through-holes 15 can be formed simultaneously in a single etching process.

Etching time must be shortened as much as possible to limit the amount that the anisotropic etching liquid also etches the nickel thin film or the polyimide partition wall. An effective method is to form a deep through-hole 15 on the second surface of the wafer using photo anisotropic etching while the first surface of the wafer is still protected with $SiO_2$ after the first and second processes. When anisotropic etching processes of the fourth process are performed on both surfaces of the wafer, the etching time required for forming the through-hole 15 can be reduced to ⅕ to 1/10 without risk of damage.

The ink grooves 14 should be made with a narrow width in terms of strength of the silicon wafer, flexure of the orifice plate 11, limitations of chip size, and other undesirable changes. However, the ink grooves 14 should be made with a broad width considering that wide ink grooves 14 reduce the number of through-holes 15 and reduce the resistance against ink flow caused by the array of ink grooves 14. Forming the ink grooves 14 to a width of between 100 and 200 microns will reduce the amount of resistance against ink flow produced by the common ink channel 10. If the ink grooves 14 and the through-hole 15 are to be formed with the same cross-sectional area, the minimal diameter of the through-holes 15 formed in the substrate surface should be in the range of from 300 to 600 microns by from 600 to 1,000 microns. Data on actual ink ejections will be discussed later.

Fifth Process

Figure 5:
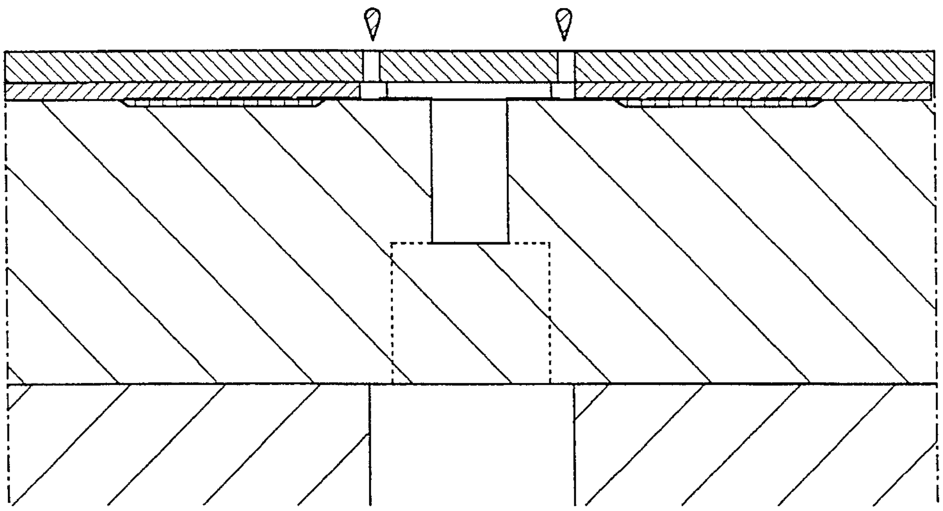
FIG. 5 is a cross-sectional view showing a full color line head with nozzle density of 1,600 dpi fabricated by forming two adjacent 800 dpi rows of nozzles with a single ink channel therebetween.

A full color line head with nozzle density of 1,600 dpi can be fabricated by forming two adjacent 800 dpi rows of nozzles with a single ink channel therebetween as shown in FIG. 5. However, the fifth and sixth processes described below are necessary for forming the nozzles in this way. The orifice plate 11 is formed by adhering and hardening a polyimide film, with thickness of about 60 microns including the approximately 10 micron thick layer of epoxy, to the first surface of the silicon wafer 1. The thickness of the film has an intimate relationship with ejected amounts of ink. The polyimide film should be between 20 and 80 microns thick when nozzle density is between 300 and 800 dpi.

Sixth Process

Ink ejection apertures 12 are formed in the polyimide film to a diameter of 40 microns directly above the thin-film heaters 3 at a density of 400 dpi using the same photo dry etching techniques described for the third process. It has been confirmed that ink ejection apertures with diameter of 20 microns can be cleanly formed at a density of 800 dpi using this reactive dry etching.

Conventionally, a thin orifice plate formed with many nozzle rows is aligned with and adhered to a substrate formed with an ink channel. The fifth and sixth processes improve alignment and fabricating yield over this conventional method. No other method can produce the large scale head shown in FIG. 5 with a high density of 800 dpi or 1,600 dpi. A long line head with slanted nozzles can be easily produced using processes described in the present embodiment. The substrate is mounted in the dry etching device at an angle between 3 to 10 degrees to the etching source. The ink ejecting apertures can be formed slanted at an angle 3 to 10 degrees from a line perpendicular to the surface of the aperture plate.

Seventh Process

The silicon wafer 1 is cut into predetermined dimensions to form a head chip.

Eighth Process

A print head is completed by die bonding lines of the head chip to a frame 17 preformed with ink supply channels.

Figure 3:
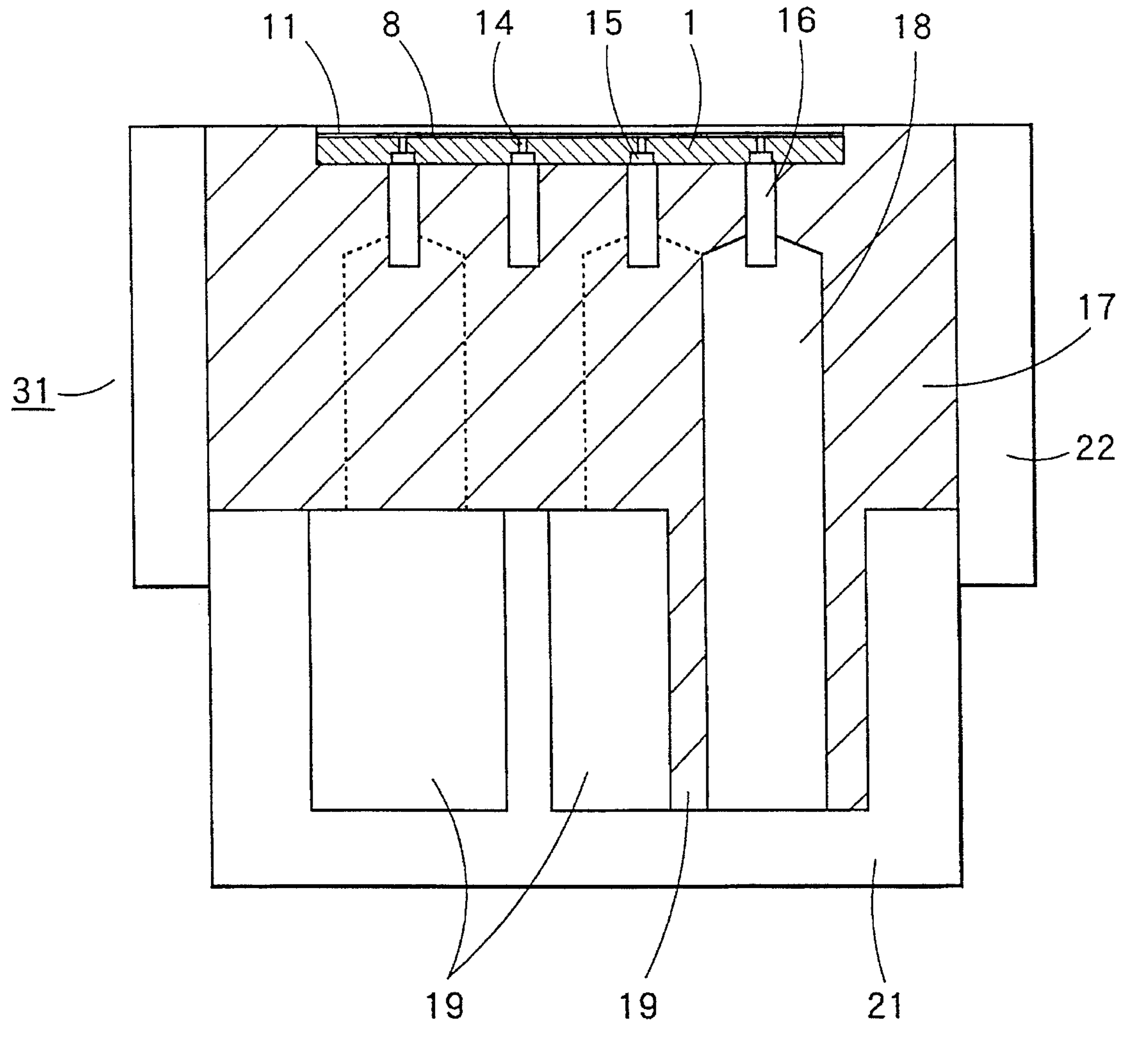
FIG. 3 is a cross-sectional view showing a line head for printing in full color on A4 sized sheets according to the present invention.

FIGS. 3, 7, 8, and 9 show an example of a line head for printing in full color on A4 size sheets. FIG. 3 is a cross-sectional view along line D—D' of FIG. 7. As shown in FIG. 1, the silicon wafer 1, the partition wall 8, and the orifice plate 11 form a head substrate for monochromatic printing. Four of the monochromatic head substrates are attached to the frame 17 using die bonding to form an integral heat chip 1, 8, 11 for printing in four colors: yellow, magenta, cyan, and black.

Figure 7:
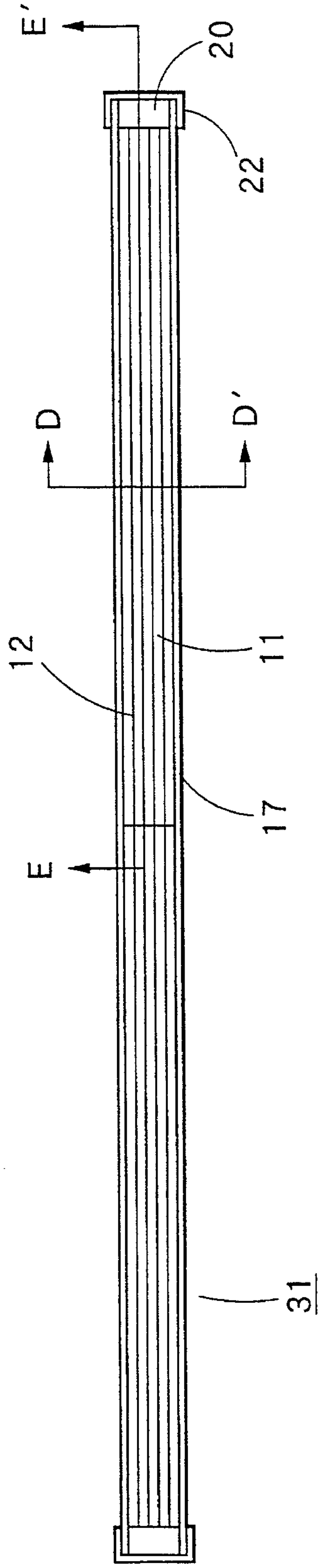
FIG. 7 is a front view showing the line head in FIG. 3.

The head chip 1, 8, 11 in FIG. 3 has a width of about 6.8 mm. As shown in FIG. 7, this includes four nozzle rows separated by about 1.6 mm. Each color of ink is supplied to ink channels 16 in the frame 17 through ink supply holes 18 of ink supply pipes 19 provided in the frame 17. Ink is supplied to the ink grooves 14 via through-holes 15 that are opened intermittently in the silicon wafer 1 so as to be parallel to the ink grooves 14 and the ink channels 16. One through-hole 15 is provided to supply every 100 to 300 ink ejection nozzles. The size and other details of the through-holes 15 will discussed later.

Although the present embodiment describes an example of a 400 dpi line head for printing in full color, the present invention can be applied to produce a scanning head with fewer nozzles or a head for printing in a single color, or in two or three colors.

Figure 8:
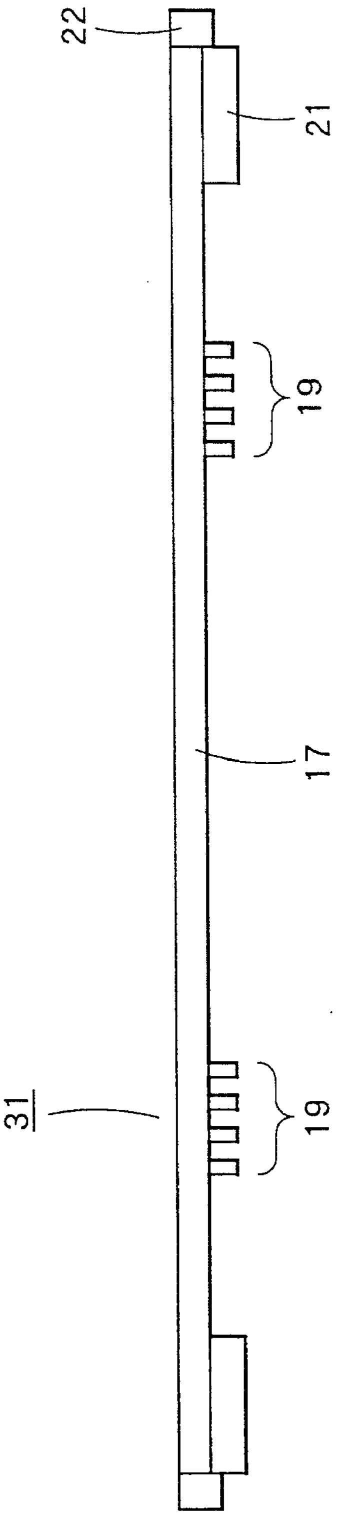
FIG. 8 is a side view showing the line head in FIG. 7.
Figure 9:
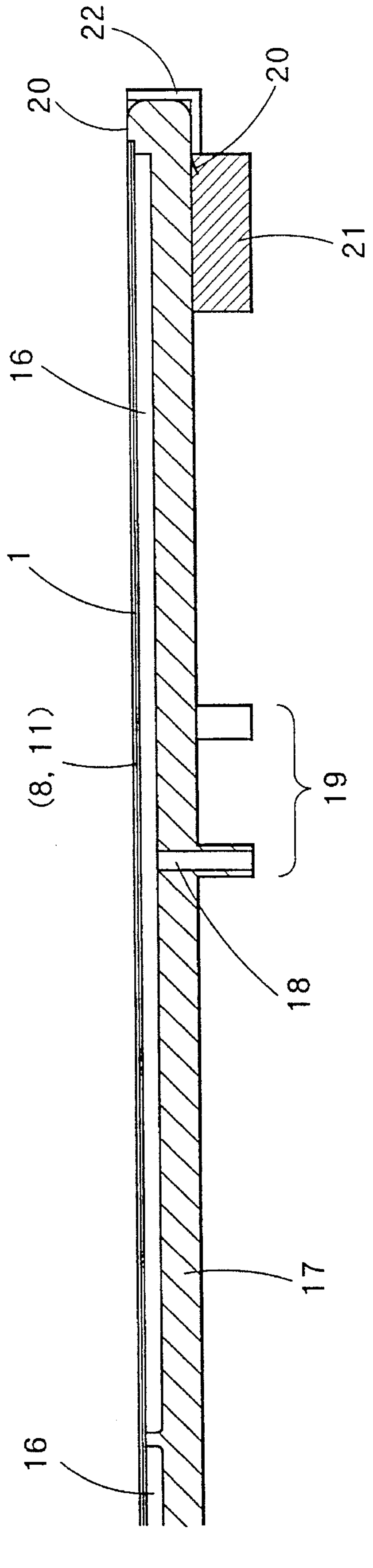
FIG. 9 is a cross-sectional view taken along line E—E' of FIG. 7.

FIG. 7 is an overhead view showing an external view of the orifice plate 11 of a line head for full color printing on A4 size sheets. FIG. 8 is a side view of the head shown in FIG. 7. FIG. 9 is an enlarged view of a cross-sectional view along line E—E' of FIG. 7. As shown in FIG. 7, each of the four aligned ink ejection nozzle rows 12 of the A4 full-color line head is about 210 mm long and has a density of 400 dpi. This head is fabricated from five or six inch wafers that are presently used in the semiconductor industry by first producing two half-sized line head chips 1, 8, 11 and assembling the two chips by aligning the ends of the two chips and die bonding them to a single frame 17. A tape carrier 20 at the right edge of the silicon wafer 1 connects signal lines and power lines, which are for driving the right side of the head, to a connector 21 fixed to the under side of the frame 17. The tape carrier 20 is fixed in place with the clip 22. The area where the wiring at the right edge of the silicon wafer 1 and the tape carrier 20 are bonded together is protected by a resin mold. However, detailed description of this process will be omitted here. Also, detailed description of the process for fabricating the inner portion of the connecter 21 will be omitted. The left side of the head is connected and mounted at the left edge of the frame 17 using the same processes as described above for the right side.

Ink supply and power supply can be performed independently for the left and rights sides of this head. About five or six lines for the power source and signals of each color must be connected using the tape carrier 20. Therefore, a terminal density of about four lines/mm must be gang bonded at the edge surface of the chip heads. This density is easily obtainable with connection mounting techniques.

Figure 10:
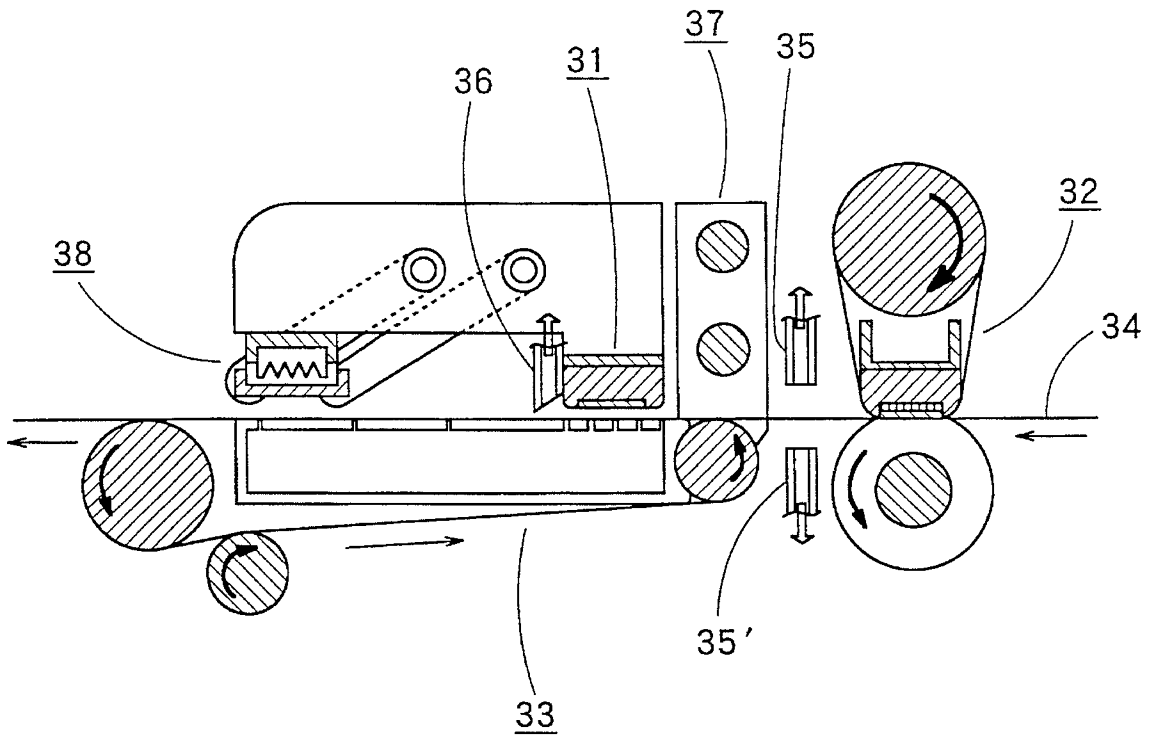
FIG. 10 is a cross-sectional view showing a high-speed full color printer in which heads according to the present invention were mounted for performing evaluation tests on the heads.

Lines heads fabricated under various conditions were mounted to the printer shown in FIG. 10 and evaluated in printing tests. The heaters of the line heads were driven with an energy density of 2.5 W/50 $\mu m^2 \times \mu S$. This is the drive condition required to produce fluctuation boiling. First odd nozzle rows were serially driven with a time lag of 0.2 microseconds between rows. Subsequent to this, even nozzle rows were serially driven with the same time lag of 0.2 microseconds between rows. The left side and the right side of the head were driven simultaneously. One line's worth of printing, that is, 3,340 dots each for four colors, is completed in about 0.34 milliseconds. This drive method prevents ejected ink droplets from coupling in flight. This drive method prevents cross talk. High-quality printing is possible with this drive method. The recording sheet was transported at a speed of one line every 0.7 ms when printing was performed at an ink ejection frequency of about 1.5 KHz. This corresponds to a printing speed of about 16 pages of A4 size paper every minute.

The evaluated 400 dpi line heads were fabricated for printing in full color on A4 size sheets. The silicon substrates used had a thickness of 400 microns. Line heads made using a (110) silicon substrate were formed with 100 micron wide ink grooves 14 and 300 micron wide and 600 micron long through-holes 15. Both the ink grooves 14 and the through-holes 15 were formed to a depth of 200 microns or more. Line heads made using a (100) silicon substrate or a 4 degree off silicon substrate were formed with ink grooves 14 having opening with of 200 microns and with through-holes 15 having opening width of 600 microns and length of 1,000 microns. The substantial cross-sectional area of the ink grooves 14 and the through-hole 15 was kept to about the same as that formed in the (110) silicon substrate so that evaluations could be performed with resistance to ink flow in these ink channels at uniform conditions. The ink channels 16 on the frame were formed to a width of about 500 microns and to a thickness of about 2,000 microns. The ink supply holes 18 were formed with a diameter of 2,500 microns.

The head of the present embodiment was evaluated as to whether or not ink was smoothly supplied with this structure. The objective of these test was to determined the maximum number of nozzles a single connection hole could supply ink to when printing at a slow ink ejection frequency of about 1.5 KHz. Heads wherein each through-holes supplied ink to 200, 300, and 400 nozzles were made. Printing was performed at printing duties of 25%, 50%, 100%. Reduction in image density caused by deficient ink supply are shown in table 1.

TABLE 1

| NOZZLES/ CONNECTION HOLE | PRINTING DUTY (%) 25 | 50 | 100 |
|---|---|---|---|
| 200 | NO CHANGE | NO CHANGE | NO CHANGE |
| 300 | NO CHANGE | NO CHANGE | SLIGHT CHANGE |
| 400 | NO CHANGE | SLIGHT CHANGE | CHANGE |

FIG. 10 is a cross-sectional view showing an embodiment of an A4 full-color printer using a line head 31 produced as described above. Using the preheating and suction-vacuum sheet transport techniques described in these applications, 20 to 30 pages of high quality full-color images can be printed on normal print sheets and dried about 100 times more rapidly that conventionally possible.

Almost the same results were obtained using a print head made from a 100 silicon substrate. When ink grooves 14 and through-holes 15 are provided with this range of surface area, one connection hole should be sufficient for every 300 nozzles for printing at a low ejection frequency. However, when printing at a high ejection frequency, one connection nozzle should be provided for every 200 to 250 nozzles.

Tests were performed using the 1,600 dpi head shown in FIG. 5 with the same ink grooves 14 and through-holes 15. Nozzles were formed with a diameter of 20 microns. Each side of the head had a nozzle density of 800 dpi. Ink droplets were ejected at a frequency of 1.5 KHz, that is, at a printing speed of about four A4 size sheets per minute. The results were the same as shown in Table 1. These results could be anticipated because the ink amount ejected from each nozzle over each unit of time is the same as the 400 dpi head or the 600 dpi head. No deterioration was observed in quality of characters printed during long-term continuous printing using the 1,600 dpi head. These results can be attributed to the partition wall being made from polyimide, which is an excellent heat-resistant resin: use of protection-layerless heaters that do not overheat the partition wall; and structure of the head that prevents changes in printing density even if the temperature of the head changes. The head fabricating process including photo dry etching of the present invention is the first to allow production of a 1,600 dpi head.

The line head described above is sufficient for printing with an ejection frequency of 1.5 KHz. However, to insure smooth supply of ink to the frame, it is desirable to provide twice the ink supply ports 18 when printing at an ejection frequency of 5 KHz and three times the ink supply ports 18 when printing at an ejection frequency of 10 KHz.

The following is a description of a second embodiment of the present invention. Increases in ejection frequency reduce the number of nozzles that each connection hole can cover the ink supply needs for. To investigate this, a serially scanning type head was made with virtually the same structure as described in the first embodiment, but with four rows of 512 nozzles. The quality of characters printed with head at an ejecting frequency of 10 KHz were evaluated. This head could be produced from a single chip on a single frame, in contrast to the head of the first embodiment, which was produced from two chips on a single frame. Nozzles of odd rows were serially fired every 0.2 microseconds. In succession with this, nozzles of even rows were serially fired every 0.2 microsecond. Therefore, all 512 nozzles were fired in 102 microseconds. Heads were produced with one throughhole 15 for every 100, 150, and 200 nozzles. Tests were performed at printing duties of 25%, 50%, and 100%. The results of the tests are shown in Table 2. It can be seen that providing one connection hole for every 100 nozzles is sufficient.

The following is a description of a third embodiment of the present invention. The nickel thin-film conductor has a greater electrical resistivity than a conductor made from aluminum or other metals. The thickness of the thin film must be increased to prevent the resistance of the wiring from increasing when forming a large-scale line head or when the common thin-film conductor is long.

However increases the thickness of the conductor thin film induces the following problems. For example, a high temperature is developed at the substrate when forming the nickel film using sputtering techniques. Also, high-speed electrons and ions infused into the film expand the film and therefore increase its volume, resulting in compressive stress remaining in the nickel film. Therefore, the thicker the film is made, the more the stress increases in the film, the easier the film peels away from the substrate, the easier the substrate deforms, and the easier damage occurs.

Also, it takes a long time to make a thin film using sputtering techniques. Therefore, energy consumption increases and productivity drops.

Additionally, etching processes for forming semiconductor patterns after forming conductor films take longer by an amount proportional to the thickness of the conductor film. The number of rejects increases due to poor resolution of the semiconductor pattern and peeling of the photoresist caused by the longer etching time increasing the amount etched from the sides of the semiconductor patterns.

The third embodiment overcomes these problems. Processes for forming the nickel thin film conductor will be described below. All other processes are the same as described in the first embodiment so their explanation will be omitted.

Figure 11:
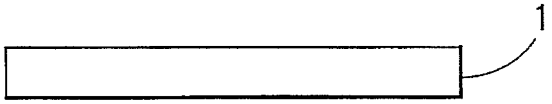
FIGS. 11(*a*) through 11(*g*) are explanatory diagrams of processes for producing the thin-film resistors and the thin-film conductors according the present invention.
Figure 11:
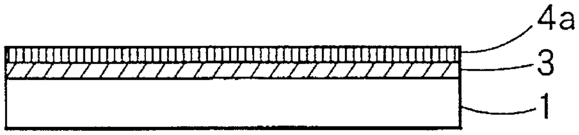
Figure 11:
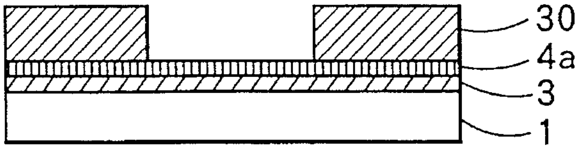
Figure 11:
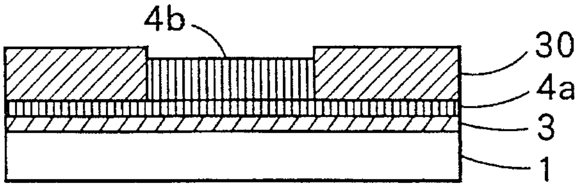
Figure 11:
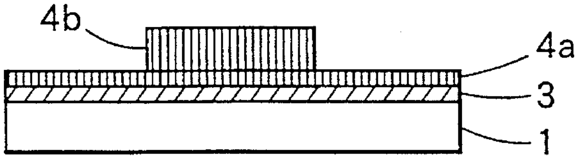
Figure 11:
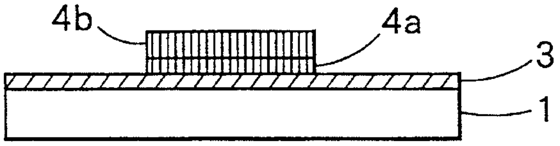
Figure 11:
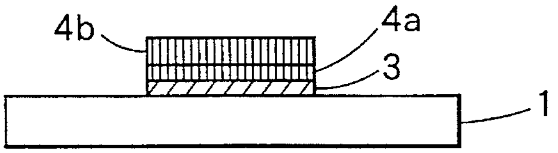

FIG. 11(*a*) shows a silicon wafer 1 on which is formed an approximately 1 micron thick layer of $SiO_2$. FIG. 11(*b*) shows a Cr-Si-SiO alloy thin-film heater 3 formed on the layer of $SiO_2$ and a nickel thin-film conductor 4*a* formed on the thin-film heater 3 by successive sputtering processes. Although not shown in the drawings, a corresponding nickel thin-film conductor 5*a* is also formed on the thin-film heater 3 in confrontation with the nickel thin-film conductor 4*a*. Each of these thin films is about 0.1 micron thick. The compressive stress of a 0.1 micron thick nickel thin film is small enough to ignore.

FIG. 11(*c*) represents processes wherein a photoresist 30 is coated on the thin-film heater 3 and the conductor 4*a* and 5*a*. After the photoresist 30 is exposed and developed, the thickness of the photoresist 30 needs to be coated thicker than the nickel plate thin-film conductors 4*b* and 5*b* to be formed in the next process. For forming the nickel plate thin-film conductors 4*b* and 5*b* to a thickness of 2 microns, the photoresist 30 of the present embodiment was formed to a thickness of 5 microns. The photoresist used was PMERP-AR900 resist for plate thick film produced by Tokyo Oka. The same processes can be performed using a different type

TABLE 2

| NOZZLES/ CONNECTION HOLE | PRINTING DUTY (%) 25 | 50 | 100 |
|---|---|---|---|
| 200 | NO CHANGE | NO CHANGE | SLIGHT CHANGE |
| 300 | NO CHANGE | SLIGHT CHANGE | CHANGE |
| 400 | SLIGHT CHANGE | CHANGE | CHANGE |

Extreme reductions in bending strength must be avoided to prevent damage to chip heads during their fabrication and assemblage. It is desirable therefore to provide narrow ink grooves and to provide as few connection holes as possible. The above-described embodiment indicates the best balance between ink groove size and connection hole size. Based on this balance, the optimum number of connection holes was determined. Therefore, if the ink grooves and the through-holes are made larger, the number of through-holes should be slightly lessened.

of resist, for example, a dry film resist such as Photec SR-3000 produced by Hitachi Kosei.

Next, to prepare the substrate for plating processes, the substrate is immersed in 5% solution of hydrochloric acid for ten minutes. Then the surface of the nickel plate thin-film conductors 4*a* and 5*a* are light etched. The substrate is washed after light etching.

FIG. 11(*d*) represents processes wherein the nickel plate thin-film conductors 4*b* and 5*b* are formed by plating to the portion not covered with photoresist 30, that is, to the conductor portion. As shown in Table 3, plating of the present embodiment was performed using sulphonamine acid nickel as the main constituent of the plating solution.

TABLE 3

| | |
|---|---|
| COMPOSITION OF PICKLING BATH | Sulphonamine acid nickel 400 g/l<br>Nickel chloride 20 g/l<br>Boric acid 40 g/l |
| Bath temperature | 50° C. |
| pH | 4.0 |
| Current density | 2.5 A/dm$^2$ |

A 2 micron thick nickel film could be formed by plating for four minutes. The nickel film could also be formed using a watt plating liquid with nickel sulphate as the main constituent or a nickel chloride solution with nickel chloride as the main constituent.

Next the photoresist is peeled off in the process depicted in FIG. 11(*e*). The nickel plate thin-film conductors 4*b* and 5*b* formed in this way have a conductor width of 40 microns and are separated by 22 microns.

Next, in the process depicted in FIG. 11(*f*), the substrate of FIG. 11(*e*) is immersed for one minute in an etching liquid including a mixture of nitric acid, acetic acid, and sulfuric acid so that the entire exposed portion of the nickel plate thin-film conductors 4*a* and 5*a* that was formed by sputtering a 0.1 micron thick layer of nickel etched away with about 0.1 microns of the surface of the nickel plate thin-film conductors 4*b* and 5*b*. This forms the nickel conductor portion. Defects formed at edge portions of the nickel plate thin-film conductors 4*b* and 5*b* formed during these plating processes are also removed during this etching process.

The pattern for the Cr-Si-SiO alloy heater is formed in the process depicted by FIG. 11(*g*) by etching. The etching liquid is 5% solution of hydrofluoric acid. A Ta-Si-SiO alloy heater could be formed instead of the Cr-Si-SiO alloy heater to achieve the same results. This method allows effective fabrication of a thick nickel thin-film conductor. Afterward, the processes described in the third process and subsequent processes of the first embodiment are followed.

Figure 12:
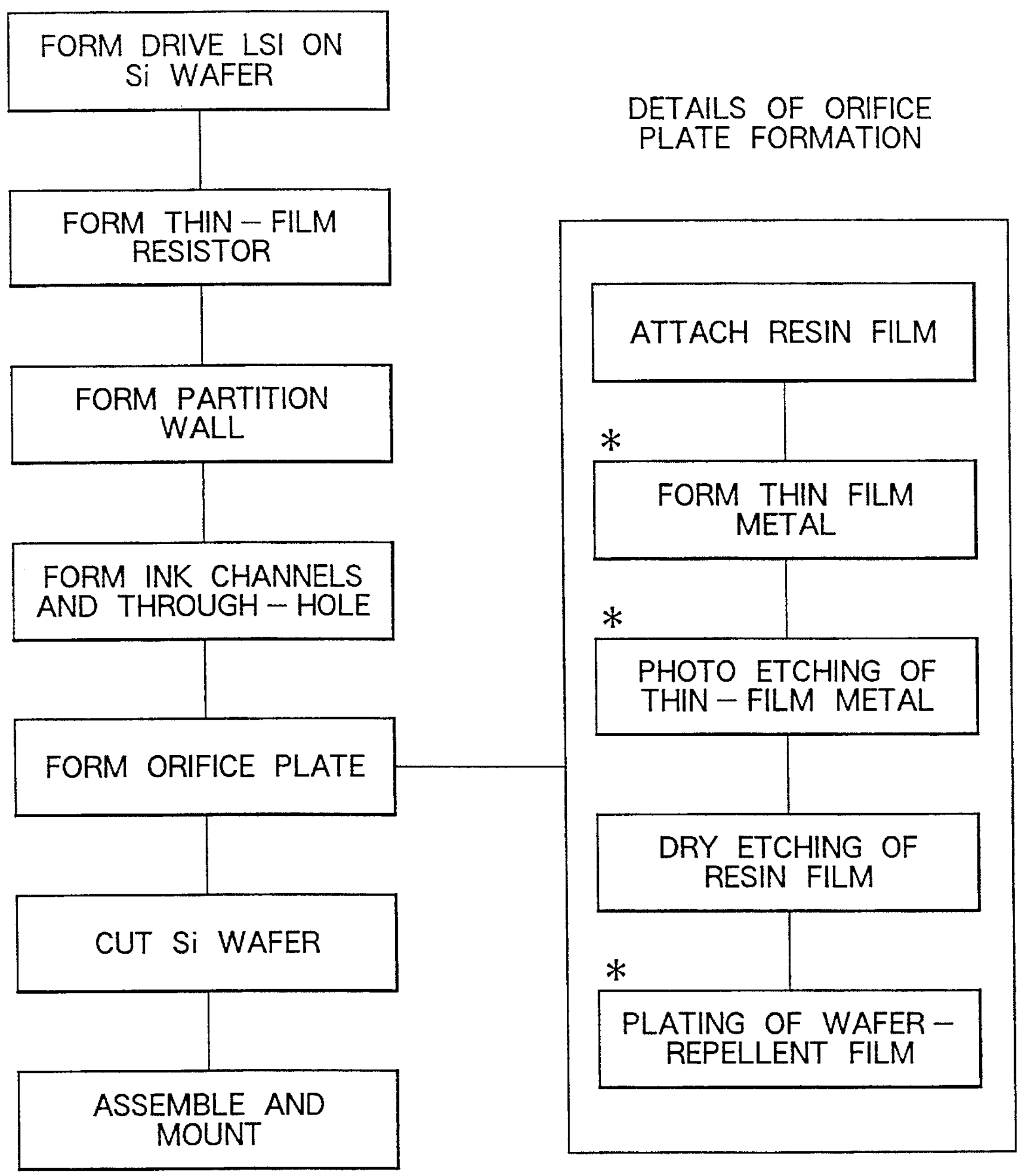
FIG. 12(*a*) is a diagram showing details of the processes for making a head according to the present invention.
Figure 13:
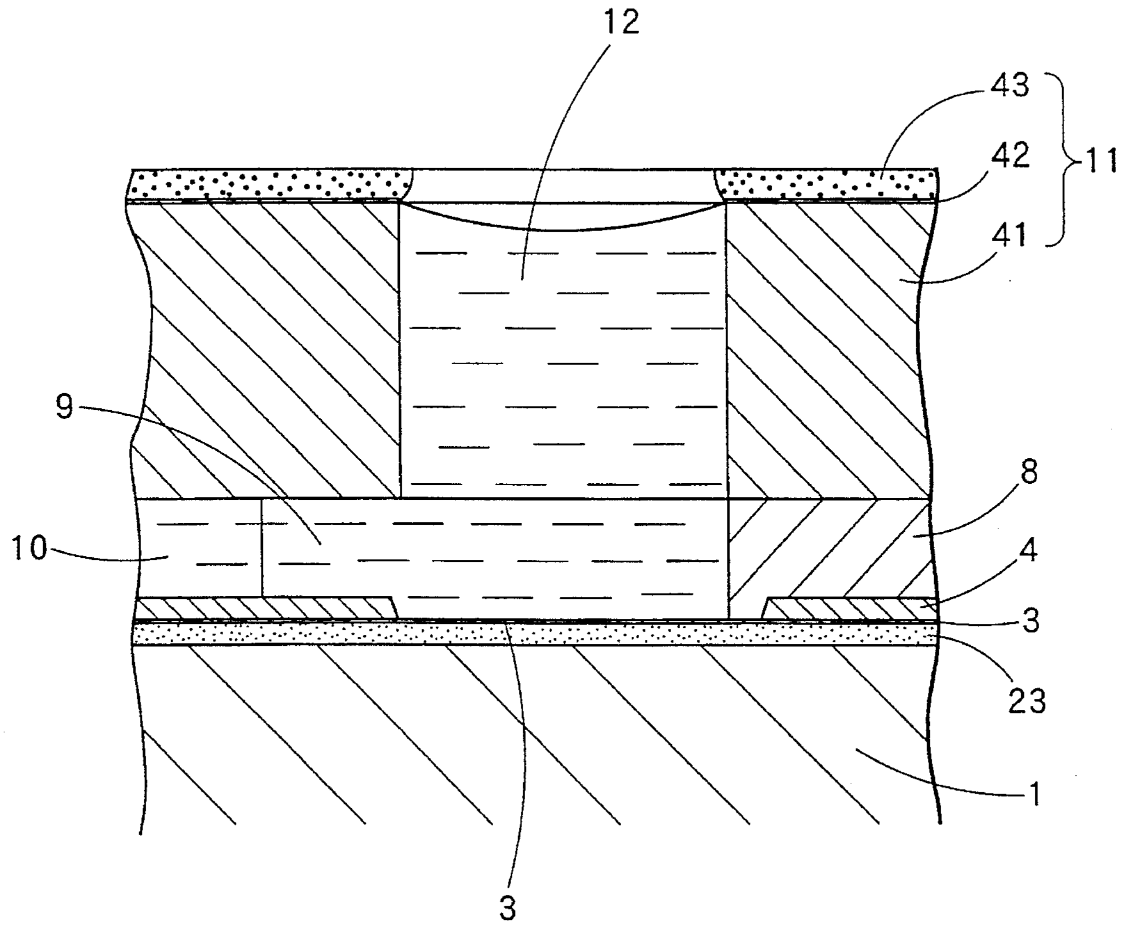
FIG. 13 is a cross-sectional view showing the area around the orifice plate formed by processes described in FIG. 12(*b*)

The following is an explanation of a fourth embodiment of the present invention wherein only the surface layer of the orifice plate is coated with a water-repellent film. FIG. 12(*a*) schematically shows processes of a fabrication method for the head described in the first embodiment. The orifice plate 11 of the head in the first embodiment is constructed of only a heat-resistant resin plate. On the other hand, as shown in FIG. 13, the orifice plate 11 of the head of the present embodiment further includes a metal thin film 42 formed to a desired thickness between 0.05 to 1.0 microns on the resin film 41; and a water-repellent film 43 with a desired thickness between 0.01 and 5 microns fixedly attached to the surface of the metal thin film 42. A process for fabricating this structure will be described below while referring to FIG. 12(*b*).

An approximately 0.1 micron thick nickel thin film 42 is formed on the structure formed by the first through fifth processes of the first embodiment. Holes are formed in the nickel thin film 42 at areas corresponding to the ink ejection apertures using photoetching with an organosilicic resist. Nozzle holes 12 are opened at right angles to the polyimide film 41 using dry etching with an oxygen plasma induced by an electron cyclotron resonance source. The nozzle holes 12 can be opened at an optional angle which is essential when assembling and mounting two chips on a common frame to make the line head shown in FIG. 7. Next, the organosilicic resist is removed. The water-repellent film 43 is formed only on the surface of the nickel thin film 42 using a plating method wherein the nickel thin film 42 serves as a plating electrode. The method of forming a water-repellent film 43 by plating is well known as composite plating. The film produced by plating with a nickel plating liquid in which is dispersed a fluorocarbon resin or graphite fluoride particles has excellent water repellency, which, as described on page 477 of the 46 vol #7 of Kagaku, results in an angle of contact near 180 degrees.

An orifice plate was made by covering the polyimide film 41 with a compound nickel plating film, that shows the same angle of contact as a fluorocarbon resin (PTFE), that is, about 110 degrees, and by covering the compound nickel plating film with a nickel plated film containing graphite fluoride, that shows an angle of contact of about 140 degrees. All nozzles ejected the same amounts of ink. The amount of ink clinging to the orifice surface was reduced so as to eliminate the need to clean the orifice surface. The graphite fluoride compound nickel plate film required especially little cleaning. This film can contribute to production of a printer that requires no cleaning of the orifice surface.

Some of the sputtering processes depicted in FIG. 12(*b*) can be eliminated by using a two-layer polyimide film structure with a preformed metal thin-film. Other metals, even those susceptible to corrosion by ink, can be used instead of nickel for the metal thin film because its surface will be covered and protected by the compound nickel plate film.

The nickel thin film 42 will be sufficiently thick to function as a plating electrode if formed to a thickness of 0.05 to 1 micron on the polyimide film 41. Thin water-repellent films 43 have been developed that can be formed by plating to a thickness of 100 angstroms, or about 0.01 microns. These thin water-repellent film 43 are formed using a method wherein a fluoride compound and an organophosphoric acid bond in a plating liquid made from an organic complex of a fluoride compound. With this method the surface layer only of the orifice plated can be covered by water-repellent film to a desired thickness of 0.01 to 5.0 microns. Also, the resultant water-repellent film shows an angle of contact of 180 degrees which completely repels water. A water-repellent film in which fluoride resin particles are dispersed and which shows an angle of contact of 170 degrees, which eliminates the need for head cleaning, can be formed to a thickness of only a few microns using fluorocarbon electrodeposition The present invention allows elimination of several processes because a $SiO_2$ layer formed during formation of the drive LSI can be used as the heat insulating layer of the heaters and also because the ink channels can be formed using a photomask.

The present invention allows forming the ink channels and through-holes in the same processes so that the overall number of process can be reduced.

Because apertures are formed in the orifice plate by photoetching after the orifice plate is adhered, the heaters and the apertures can be easily aligned. This allows production of a 1,600 dpi head, which is three times larger than conventional heads.

Cylindrical orifices can be formed by using reactive dry etching for the photoetching method of the orifice plate. This prevents changes in print density caused by changes in temperature.

Also, the cylindrical apertures can be formed at a slant of 3 to 20 degrees, which is necessary to fabricate a long line head.

Because relatively few through-holes are provided following the direction of narrow ink grooves, problems that lower yield, such as cracking of the silicon wafer, can be prevented.

Because the surface of the orifice plate is provided with a water-repellent layer, head cleaning process can be reduced or eliminated.

Because several tens or several hundreds of thousands of nozzles can be formed at once using only thin-film processes on a silicon wafer, a large-scale high-density head can be inexpensively fabricated.

A printer fabricated according to the present invention does not require head temperature control, drive pulse width control, or color balance control.

Figure 14:
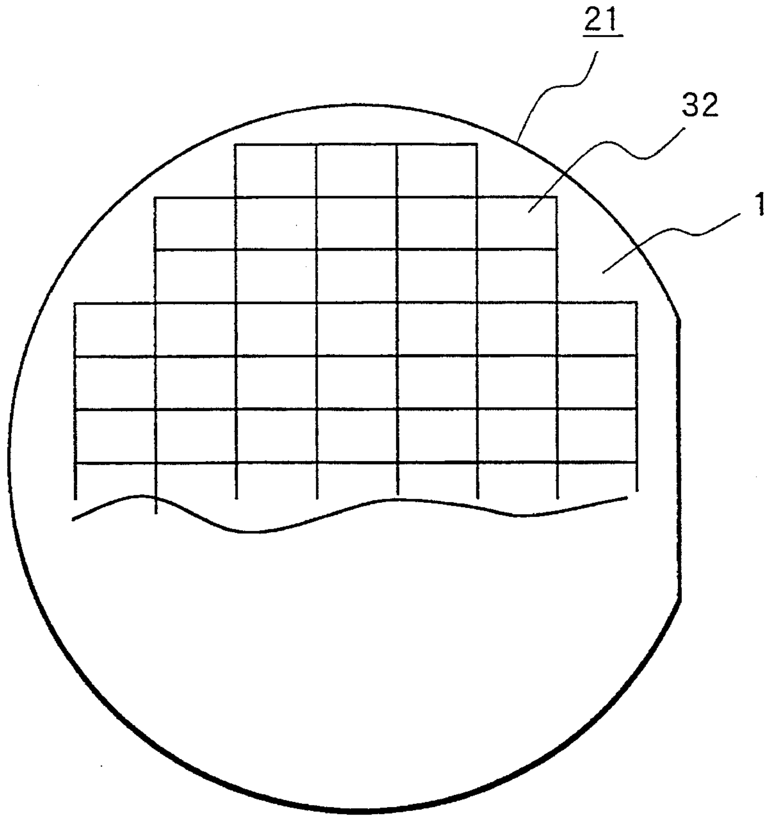
FIG. 14 is a schematic diagram showing a wafer formed with head chips using first through fifth processes of the first preferred embodiment.
Figure 15:
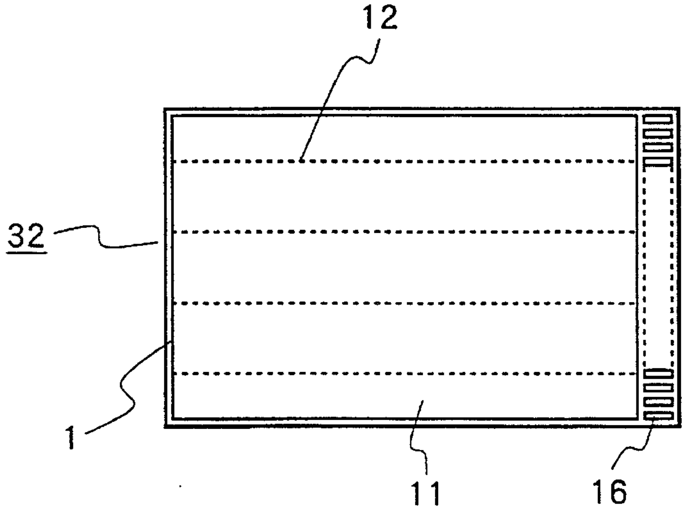
FIG. 15 is a schematic plan view of a head chip formed to the wafer of FIG. 14.
Figure 16:
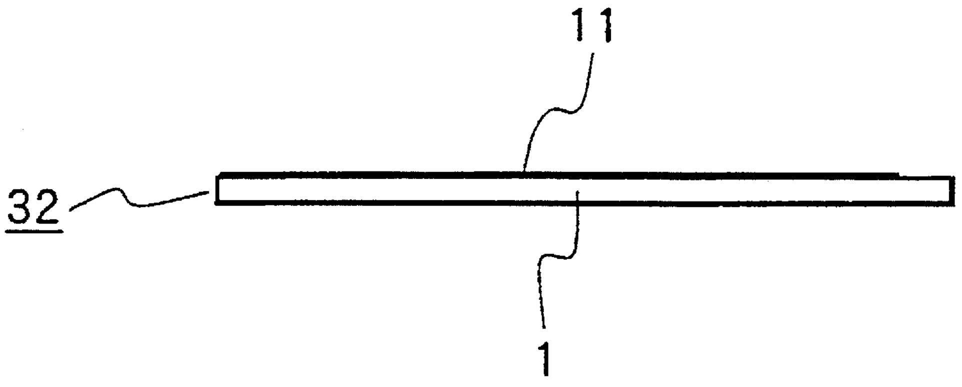
FIG. 16 is a schematic side view of the head chip of FIG. 15.

FIG. 14 shows a print head wafer 21 including a plurality of print head chips 32 produced using the first through sixth processes of the first embodiment. FIGS. 15 and 16 show an example of one of the print head chips 32 formed to the print head wafer 21. Each print head chip 32 is formed with four linear rows of 128 nozzles 12, thereby allowing 300 dpi full-color printing. Each print head chip 32 is about 7 mm wide by 12 mm long. Each nozzle 12 is connected to an LSI drive circuit by wire bonding 12. The nozzles are driven by drive signals introduced through the wire bonding 12.

Figure 17:
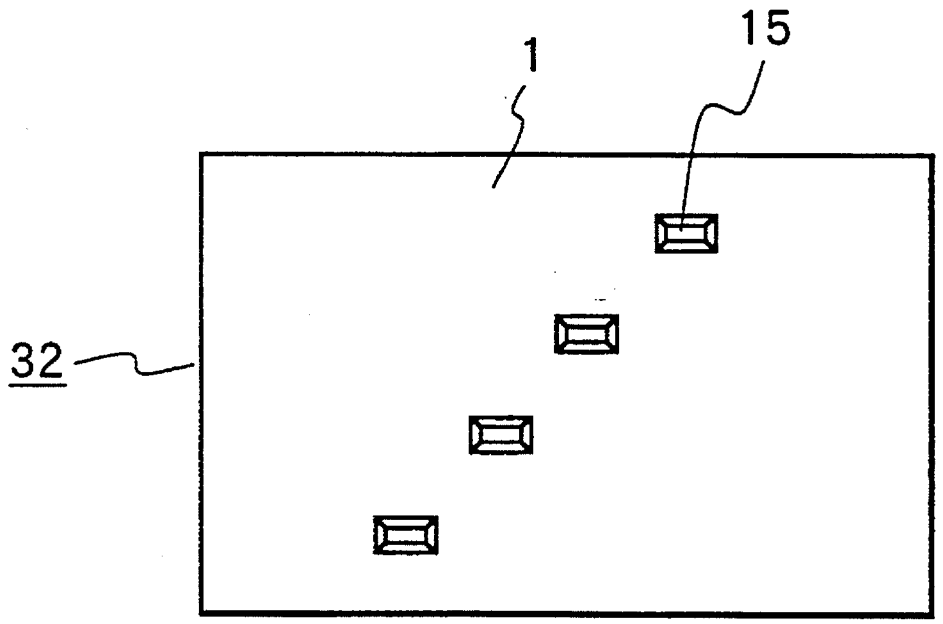
FIG. 17 is a schematic rear view of the head chip of FIG. 15.

FIG. 17 shows ink supply channels 15 opened in the reverse side of the chip 32. After mounting the chip head 32 to a printer, ink is supplied to each nozzle through these ink supply channels 15.

During manufacture of large scale integrated circuits (LSI), a large number of LSIs are formed to a single wafer and the LSIs are all tested before the wafer is cut. It would be desirable to test the print head chips 32 for defects in the same manner, that is, before the wafer is cut. With conventional heads, which have only a hundred or so nozzles, it is less expensive to test ejection status after cutting the wafer and mounting the print heads to an ink tank and to the printer. Therefore, conventionally, the ejection status of print heads is not tested before the heads are mounted to the printer. When using conventional testing methods, there is also a risk that the ink used during testing will dry or otherwise clog the nozzles of the head. This is especially a potential problem when testing with water-based pigment-type inks.

Figure 18:
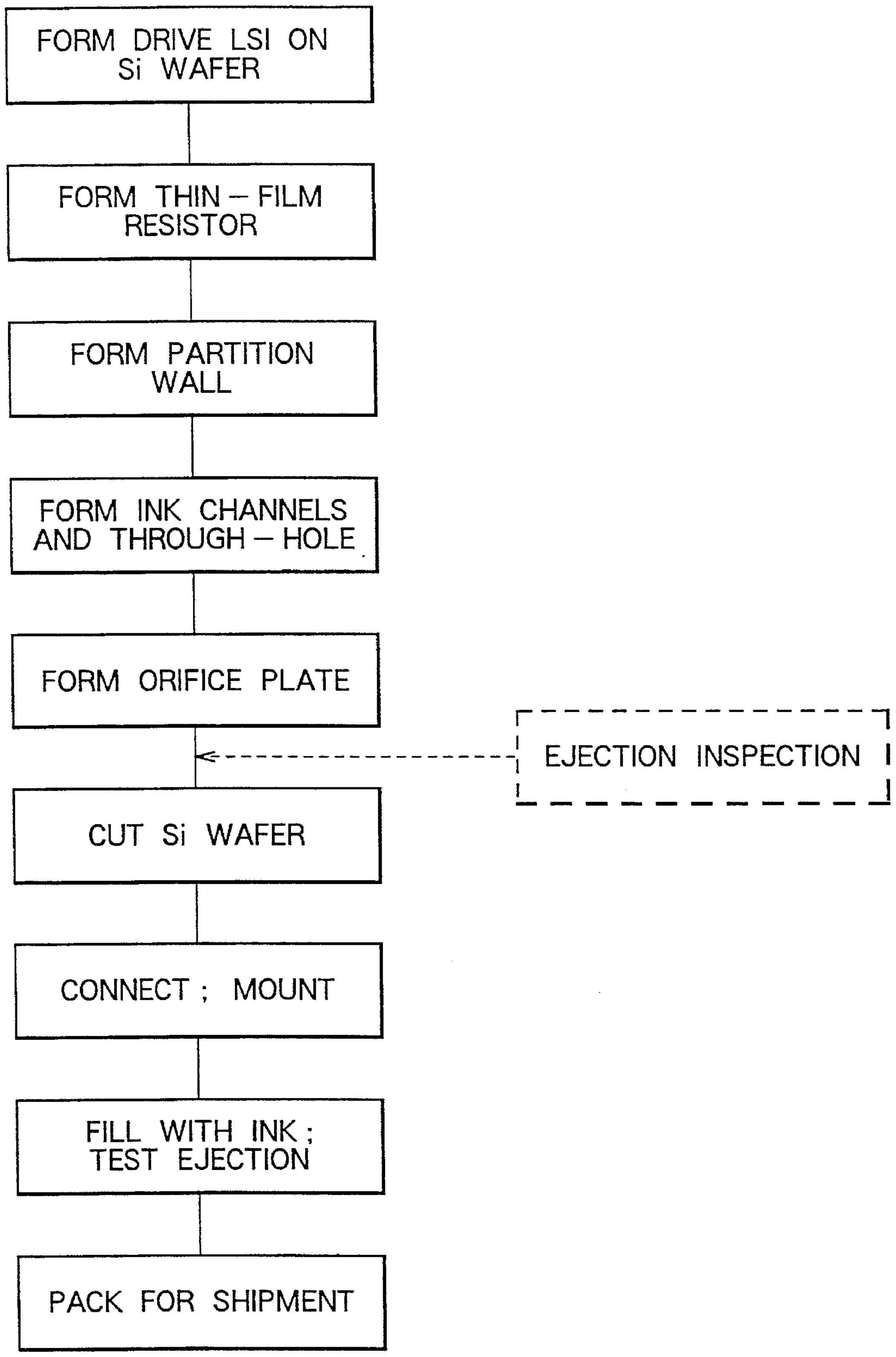
FIG. 18 is a block diagram showing processes of the first embodiment with an additional process for testing ejection of the head chips.

The following is an explanation of a method of testing the print head chips 32 of the wafer 21 shown in FIG. 14. As shown in FIG. 18, the print head wafer 21 is tested after orifice plates are formed in the fifth and sixth processes and before the wafer is cut in the seventh process. After cutting the wafer 21, only good print head chips 32 are connected and mounted to a printer, filled with ink, given a final ejection test, and then packaged for shipment.

Figure 19:
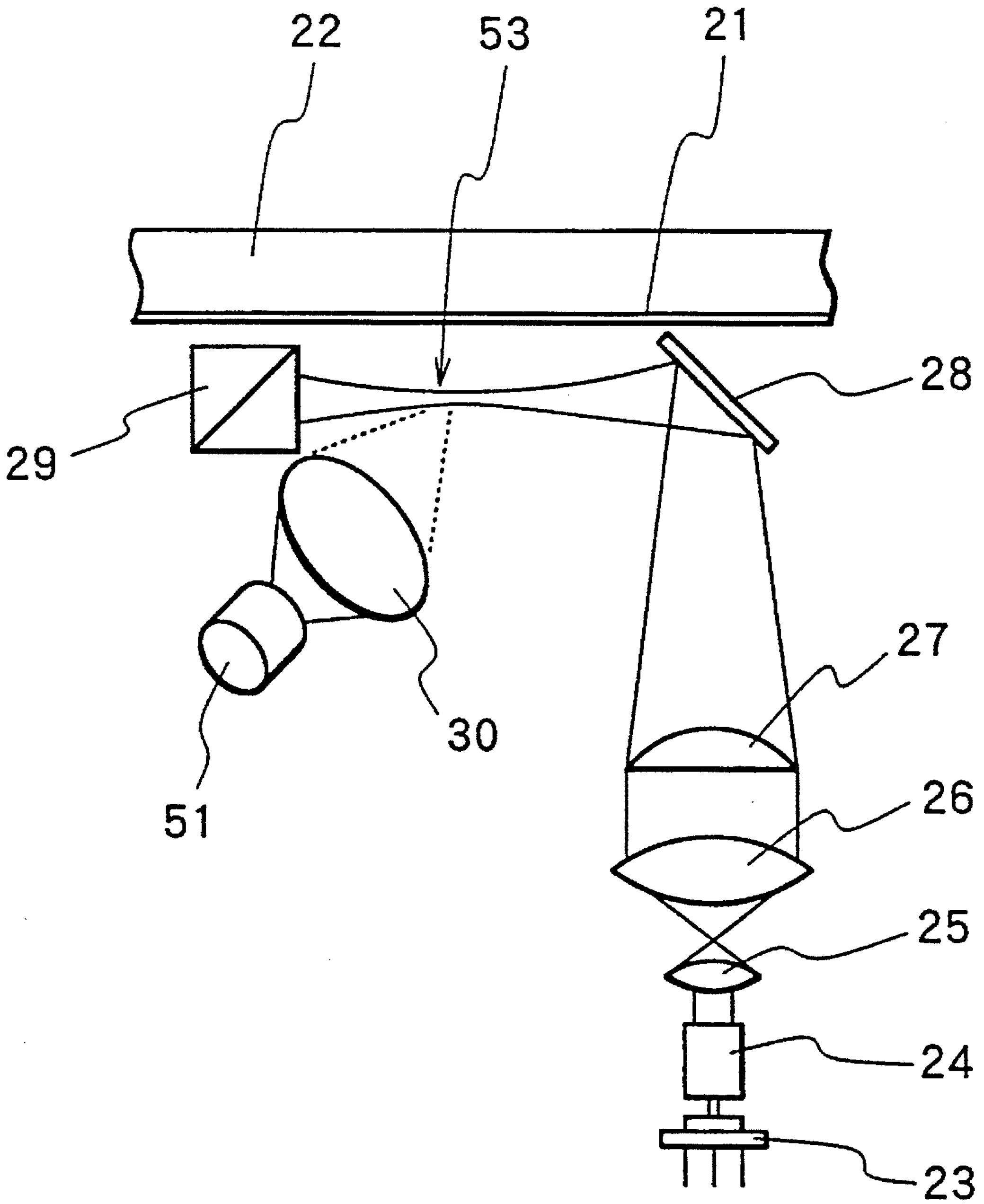
FIG. 19 is a schematic diagram showing configuration of equipment for testing the head chips.

FIG. 19 shows an example of equipment for testing the print head wafer 21. A wafer-suction water tank 22 is vacuum attached to the rear surface of the wafer 21 so as to follow the outer periphery of the wafer 21. That is, in FIG. 19, print head chips of the wafer 21 are facing downward. With this configuration, the rear surface of the wafer 21, that is, the surface in which the ink supply channels are opened, forms the base of the water tank 22. The water tank 22 is then filled with pure water. Then the ink supply channels and nozzles are filled with pure water by applying pressure from the tank side or by applying suction from the orifice plate side of the wafer 21.

Figure 20:
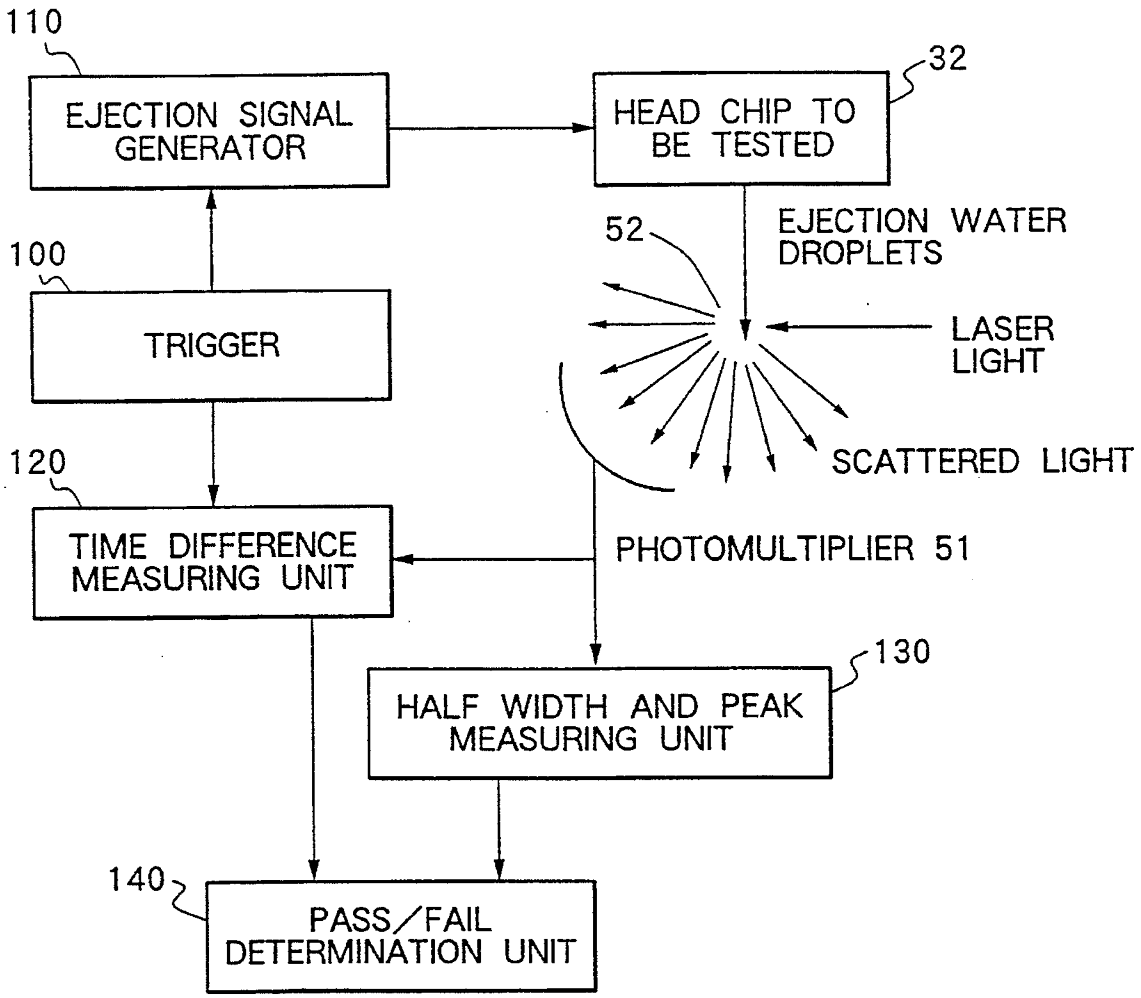
FIG. 20 is a block diagram showing additional equipment for testing the head chips.

Although not shown in the drawings, an integrated prober is set to the bonding pad of the chip head to be tested. Also, an ejection signal generator 110 shown in FIG. 20 is connected to the integrated prober. With this configuration, electric signals from the ejection signal generator 110 can be selectively applied to the bonding pad for each nozzle, thereby causing the head chip 32 to eject water droplets from a selected nozzle.

An optical system is set in confrontation with the print head chip 32 to be inspected. The optical system includes a semiconductor laser 23, a coupling lens 24, expander lenses 25 and 26, a cylindrical lens 27, a mirror 28, a light absorption box 29, a condensing lens 30, and a photomultiplier 51. The semiconductor laser 23 generates a laser light that is shaped by the coupling lens 24. The resultant laser light passes through the expanding lenses 25, 26 where it is expanded into parallel rays. The laser light then passes through the cylindrical lens 27 and emerges as a flat light bundle 53. The mirror 28 refracts the flat light bundle 53 to a position about 10 mm in front of the print head chip 32 to be tested. The flat bundle of light 53 is then almost completely absorbed by the light absorption box 29.

Water droplets ejected from the print head chip 32 cross the flat bundle of light. The condensing lens 30 gathers light scattered by the ink droplets and the photomultiplier 51 converts the gathered light into an electric signal. The cylindrical lens 27 is provided to flatten the bundle of light in order to test all of the nozzles 12 aligned in the head chip 32 at once. The cylindrical lens 27 has a long focal point that enables testing all at once the four nozzle rows, which are separated by about 4 to 5 mm.

During actual printing, a print head is usually separated from the print sheet by a distance of only 1 to 2 mm. However, it would be difficult to introduce the flat light from the mirror 28 almost parallel with the wafer 21, as shown in FIG. 19, and also separated by only 1 to 2 mm to test ejection under circumstances near to actual printing.

However, it has been confirmed that because the print head produced in the first embodiment is capable of ejecting water droplets at the high speed of 10 to 15 m/s, ejected water droplets will travel in a virtual linear path up to about 20 mm from the print head when little air flow occurs near the nozzle surface. That is, the ejection path of ejected water droplets can be reliably reproduced at a distance of about 10 mm from the nozzle surface. The flight path of ejected water droplets can be tested sufficiently well at this distance so that testing whether or not print heads are defective is possible at this distance.

One flat bundle of light is insufficient to cover all nozzles of long nozzle rows containing 256 to 512 nozzles. However, long nozzle rows can be reliably tested by moving the optical system in steps while the probing remains in a fixed condition.

FIG. 20 is a block diagram representing further equipment used in the testing method described above. A trigger 100 for outputting an ejection start signal is connected to the ejection signal generator 110, which is in turn connected to the head chip 32 to be tested as described above. A time difference measuring unit 120 is connected to receive output from the trigger 100 and from the photomultiplier 51. An output of the time difference measuring unit 120 is connected to the input of a pass/fail determination unit 140. A half width and peak measuring unit 130 is connected to receive the output from the photomultiplier 51, and the output of the half width and peak measuring unit 130 is connected to the input of the pass/fail determination unit 140.

While referring to FIG. 20, the testing method of the present embodiment will be described next, assuming that water droplets are ejected at a speed of 10 m/s and that the width of the condensed laser light is 300 μm. Ejection of water droplets from a particular nozzle of the head chip 32 starts according to the ejection start signal from the trigger 100. If this nozzle ejects water droplets properly, scattered light will be picked up by the photomultiplier 51 for about 30 μs about 1,000 μs after the ejection start signal is outputted. If the nozzle is defective, either the nozzle will not eject water droplets or the speed at which droplets are ejected will be slow. Therefore, time when scattered light is observed will be greatly delayed for defective nozzles and also the half width and the peak of the scattered light will differ greatly from normal values.

The duration of time for light scattered by properly ejected water droplets is about 20 μs and, as described in copending U.S. patent application No. 08/405,709, the time interval required to completely remove cross-talk from between adjacent nozzles is about 30 μs. Therefore, the time interval for testing of each nozzle should be set to 50 μs or more. By setting the time interval to 500 to 1,000 μs, water droplets ejected at a slow speed from defective nozzles can be perfectly detected. Even if the time interval is set to 500 to 1,000 μs, a head chip 32 with four rows of 128 nozzles can be tested in less that one second. Assuming that the wafer 21 is formed with 100,000 nozzles, then testing ejection of all nozzles of the wafer 21 would require only 50 to 100 seconds using the above-described method. Efficiency at which test preparations and stepping operations are performed needs to be improved to reduce total testing time.

In the above-described testing method, proper functioning head chips will eject water droplets from proper functioning nozzles according to an inputted ejection signal. Additionally, water droplets ejected from properly functioning nozzles will all have virtually the same speed and shape. Therefore, the time at which all water droplets intersect a slit-shaped light beam condensed at a fixed position about 10 mm from the surface of the nozzles will have a fixed relationship to the time that the start signal was inputted. Light scattered when the water droplets intersect the light bundle can be detected by a photosensor such as the photomultiplier 51. Therefore, good and defective head chips can be distinguished based on the time difference between the time of the ejection start signal and the time that light was scattered.

This time difference will reach an infinite value for defective nozzles or head chips that eject no ink droplets. Some defective head chips and nozzles will eject water droplets, but at a slower speed or smaller size. Therefore, by determining defective head chips and nozzles based on both time difference and on amount of received light, testing can be performed automatically after setting standards for good and defective head chips and nozzles.

Because, pure water, which has a high resistance, is used as the ejection liquid, galvanization, electric leaks, and water leaks when the bonding pad 16 is probed are prevented. Also, a weak suction is applied to the underside of the wafer 21 to prevent ejected water droplets from clinging to surrounding components and to prevent disturbing flight path of the water droplets. Because pure water is used instead of ink, further processes such as mounting the head chips to printers can be performed by merely removing the water from the head chips after testing is completed and either drying the wafer or allowing the wafer to naturally dry.

Even when a plurality of head chips with a total of over 100,000 nozzles are formed at once in a high density to the surface of a wafer, the ejection of each head chip can be individually tested before the wafer is cut, that is, while the head chips are integrally connected. Therefore, further processes need only be performed on good head chips. Also, because pure water is used during the test, this test method will not result in clogged nozzles or related problems. The head chips can therefore be produced at lower costs.

While the invention has been described in detail with reference to specific embodiments thereof, it would be apparent to those skilled in the art that various changes and modifications may be made therein without departing from the spirit of the invention, the scope of which is defined by the attached claims.

What is claimed is:

1. A print head testing method comprising the steps of:

filling a head with pure water;

starting ejection of water droplets of the pure water by application of a start signal;

irradiating ejected water droplets with condensed light;

detecting condensed light scattered by the ejected water droplets;

correlating time at which the scattered light was detected with time of the start signal; and determining whether the head is good or not based on the correlation of the time at which the scattered light was detected and the time of the start signal.

2. A print head testing method according to claim 1, wherein detection of the condensed light scattered by the ejected water droplets is performed by a photosensor which outputs an electrical signal corresponding to the condensed light scattered by the ejected water droplets, the electrical signal having a waveform, and wherein whether the head is good or not is determined based further on the waveform of the electrical signal outputted from the photosensor.

3. A print head testing method according to claim 1, wherein detection of the ejected water droplets by the condensed light is performed in a position belonging to a virtual linear path in which the ejected water droplet travels.

4. A print head testing method comprising the steps of:

placing a print head wafer including a plurality of print head chips in a predetermined position, each print head chip being formed with a predetermined number of linear rows, each linear row including a predetermined number of nozzles;

filling the nozzles of each print head chip with pure water;

starting ejection of water droplets of the pure water by application of a start signal;

irradiating ejected water droplets with condensed light;

detecting condensed light scattered by the ejected water droplets;

correlating time at which the scattered light was detected with time of the start signal; and determining whether the head is good or not according to the correlation of the time at which the scattered light was detected and the time of the start signal.

5. A print head testing method according to claim 4, wherein detection of the condensed light scattered by the ejected water droplets is performed by a photosensor which outputs an electrical signal corresponding to the condensed light scattered by the ejected water droplets, the electrical signal having a waveform, and wherein whether the head is good or not is determined based further on the waveform of the electrical signal outputted from the photosensor.

6. A print head testing method according to claim 4, wherein detection of the ejected water droplets by the condensed light is performed in a position belonging to a virtual linear path in which the ejected water droplet travels.

* * * * *